(a)  (b)

United States Patent Office 3,246,213
Patented Apr. 12, 1966

---

3,246,213
RECTIFIER MOUNTING AND HEAT DISSIPATING STRUCTURE
Neil Townsend Hannan, King's Cross, London, England, assignor to Westinghouse Brake and Signal Company, Limited, London, England
Filed Apr. 27, 1962, Ser. No. 190,696
Claims priority, application Great Britain, May 4, 1961, 16,184/61
2 Claims. (Cl. 317—234)

This invention relates to rectifier mountings and relates particularly to an assembly of rectifier devices with cooling means.

According to the present invention there is provided a rectifier mounting comprising a plurality of plates each adapted to carry a rectifier device on one face and an extension of each of which is disposed at an angle thereto into the region of the other face of the plate to form a cooling fin for the respective rectifier devices and also to form means for mounting the plate along with the other plates.

Figure 1:
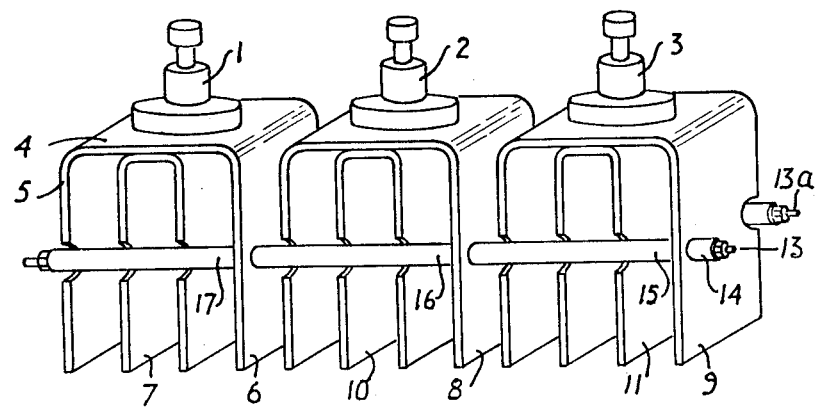
Figure 2:
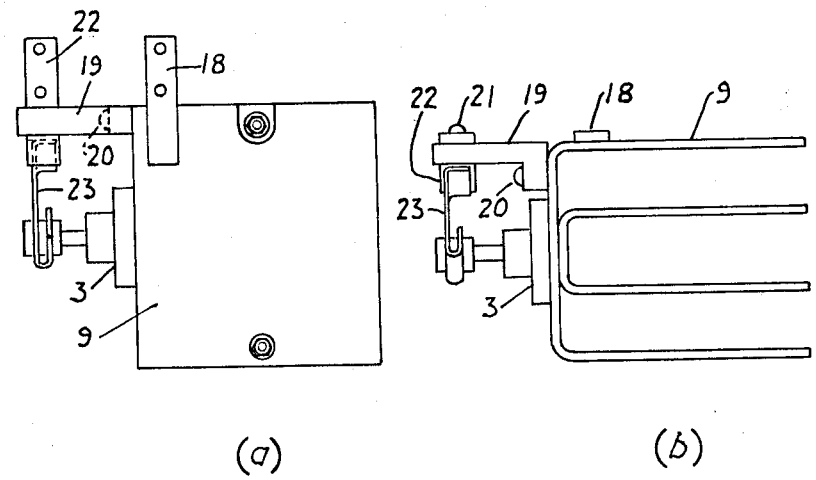

In order that the invention may be clearly understood and readily carried into effect, the invention will be further described with reference to the accompanying drawings in which:

FIGURE 1 illustrates one rectifier mounting in accordance with one embodiment of the invention and FIGURE 2 illustrates one manner of fixing terminal tags to the embodiment of FIGURE 1.

Referring to the drawing mountings for three semi-conductor rectifier devices 1, 2 and 3 are shown. The device 1 is mounted on a plate 4, having two extension portions 5 and 6 which are bent out at right angles to 4 and into the region on the opposite side of 4 to that on which 1 is mounted. The plate 4 with extension 5 and 6 therefore forms a U-shaped section. A further plate 7 of U-shaped section is mounted within the first mentioned U-shaped section as shown with the bases of the sections together, a firm face to face fixing being achieved by the clamping bolt, which is not shown, for the device 1 and which passes through both plates into the base of 1. Clearly, other forms of clamping may be employed if desired.

The rectifier devices 2 and 3 are mounted in the same manner as the above on further U-shaped plates 8 and 9 with further respective plates 10 and 11 inside them.

The extension to the plates form cooling fins for the rectifier devices and the outer extensions to the plates form a convenient way of mounting an assembly of more than one rectifier device together by providing insulated rods such as 13 and 13a as shown in the drawing with suitable spacers such as 14, 15, 16 and 17 to separate the fins of each rectifier both electrically and mechanically from its neighbor. The rods 13 and 13a are screw-threaded at each end and provided with nuts to hold the assembly firmly together. Furthermore if the rods 13 and 13a are provided with sufficient extensions, these can be employed in known manner as fixings for brackets for mounting the complete assembly on a chassis. In the assembly shown in the drawing, considering the plate 4, the extension 6 is provided with a hole to take the rod 13 at its forward edge and the extension 5 is provided with a hole to take the rod 13a at its rearward edge, the other fins being provided with slots as shown. In this way a substantially simpler assembly procedure is possible than if each fin was to be provided with holes, because only two spacers per rectifier are necessary as compared with eight.

The rectifier devices 1, 2 and 3 may be connected in series or in parallel as required and although the terminal tags are not shown in FIGURE 1 for simplicity the arrangement of terminal tags for a single mounting plate is shown in two views in FIGURE 2 (a) and (b). Referring to FIGURE 2, assuming the mounting plate shown is that associated with the rectifier device 3, that is the U-shaped section 9, a negative terminal tag 18 is fixed by soldering to 9 as shown and is provided with a pair of holes for making connection. On the face of the U-shaped section, which carries the rectifier device 3, there is provided an insulating angle member 19 fixed thereto by a single screw 20 and fixed to 19 by a further single screw 21 is a further terminal tag 22 also having a pair of holes. Tag 22 is bent to provide a suitable fixing flange for a press-on contact member 23 which contacts in known manner the cathode terminal of the device 3.

Each of the outer U-shaped sections is provided with terminal tags arranged in the above manner so that as will be appreciated, the terminal tags are readily accessible from the outside of the complete assembly without dismantling and connections may readily be made as desired according to the manner in which the rectifier devices are to be operated.

Although not shown, a fuse may be encorporated in each of the connecting pieces such as 23 referred to above.

It is often desirable moreover in an assembly such as described above to provide voltage dividing resistors or other components on the assembly and by virtue of the fact that in an assembly according to the invention the cooling fins do not in any way enclose the rectifier devices the mounting of these additional components can be readily achieved.

Having thus described my invention what I claim is:

1. A combined rectifier mounting and heat dissipating structure comprising a first U-shaped member of heat conductive material defined by a plate and extensions at right angles thereto, and at least one other such U-shaped member having its plate in contact with the plate of said first U-shaped member and having its extensions within and generally parallel to the extensions of said first U-shaped member, a rectifier device mounted on said plate opposite said extensions, said U-shaped members comprising the principal heat dissipating structure for said rectifier device, and at least one additional such rectifier mounting and heat dissipating structure, and rods means passing through said extensions for securing said structures together.

2. The apparatus of claim 1, said rod means including rods and spacers thereon, means on said rods for applying compressive force to said spacers, and the extensions of each said structure being clamped between and held by said spacers.

References Cited by the Examiner

UNITED STATES PATENTS

| 2,720,616 | 10/1955 | Vanderhoof | 317—234 |
| 2,730,663 | 1/1956 | Harty | 317—234 |
| 2,965,819 | 12/1960 | Rosenbaum | 317—234 |

FOREIGN PATENTS 768,103  2/1957  Great Britain.

DAVID J. GALVIN, *Primary Examiner.*
BENNETT G. MILLER, *Examiner.*